United States Patent
Douglis et al.

(10) Patent No.: US 6,487,596 B1
(45) Date of Patent: Nov. 26, 2002

(54) ADAPTIVE MODEM CONNECTION LIFETIMES

(75) Inventors: Frederick Douglis, Bernards Township, Somerset County, NJ (US); Thomas Joseph Killian, Westfield, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/327,342

(22) Filed: Jun. 5, 1999

Related U.S. Application Data

(60) Provisional application No. 60/092,886, filed on Jul. 15, 1998.

(51) Int. Cl.[7] ............................................. G06F 15/16
(52) U.S. Cl. ...................... 709/227; 709/203; 709/226; 375/222; 370/420; 713/320
(58) Field of Search ................................ 709/231–235, 709/203, 227, 226; 375/222; 370/232–238, 254, 230, 420; 713/201–202, 320–324; 379/902, 908, 201, 88.13, 88.17, 93.09, 201.12, 207.1, 221.09, 265.09, 900, 93.12, 93.07; 705/418

(56) References Cited

U.S. PATENT DOCUMENTS

| | | | |
|---|---|---|---|
| 5,493,670 A | | 2/1996 | Douglis et al. |
| 5,668,857 A | * | 9/1997 | McHale .................... 379/93.07 |
| 5,903,642 A | * | 5/1999 | Schwartz et al. ........... 379/309 |
| 5,903,721 A | * | 5/1999 | Sixtus ........................ 713/201 |
| 5,933,490 A | * | 8/1999 | White et al. ................ 379/221 |
| 6,009,161 A | * | 12/1999 | Babbitt et al. .............. 379/264 |
| 6,332,161 B1 | * | 12/2001 | Sasson ........................ 709/203 |
| 6,201,830 B1 | * | 3/2002 | Chellali et al. ............. 375/222 |

FOREIGN PATENT DOCUMENTS

WO   WO 01/47142 A1   *   6/2001

OTHER PUBLICATIONS

Douglis et al, "Adaptive Disk Spin–down Policies for Mobile Computers", Computing Systems, 8(4):381–413, Fall 1995.
Perkins, "Mobile IP. Design Principles and Practices", Addison Wesley, 1998, pp. 1–26.

* cited by examiner

*Primary Examiner*—Dung C. Dinh
*Assistant Examiner*—Hieu Le

(57) ABSTRACT

In an arrangement where users are connected to an ISP through a bank of modems, a time-out threshold is then selected for the user based on the user's connection pattern. The threshold is varied dynamically in response to access patterns, in an attempt to trade the benefit accrued by using the ISP's modem and phone line for a shorter period of time, against the inconvenience to the user from having to reestablish a connection to the ISP. Specifically, the time interval between the last disconnection by the user and the time of reconnection is evaluated, and when this time interval is shorter than a preselected threshold, then the time-out threshold is increased. When this time interval is longer than the preselected threshold, then the time-out threshold is decreased. Typically, when the time-out threshold is decreased, it is decreased by a significantly smaller amount that the amount by which it is increased, when it is increased.

17 Claims, 2 Drawing Sheets

ADAPTIVE MODEM CONNECTION LIFETIMES

RELATED APPLICATION

This application is related to, and claims priority from provisional application No. 60/092,886 filed Jul. 15, 1998.

BACKGROUND OF THE INVENTION

This invention relates to modem communications and, more particularly, to proactive shutdown of inactive modems of an Internet Service Provider.

In computers, as in real life, use of a resource often comes at a cost that is related to the duration of use. A decision to stop using the resource saves money for the duration that use is stopped, but the action of stopping or starting the use (or both) often presents an extra expense.

A simple illustration of this truism is the light bulb. Turning off a light bulb when leaving a room saves the cost of electricity that was not used. However, the action of turning the light bulb on again introduces a stress on the bulb's filament that will cause the light bulb to burn up sooner and be in need of replacing. A question arises as to whether turning off a light bulb for a some given period of time saves more money in unused electricity than the extra incremental light bulb replacement expense that must be accounted for. Intuitively, the answer to this question depends on the duration of the period of time.

In the computer arts, a similar question arises in connection with operating various equipment, such as the motor that spins the storage disk of a hard drive. Continuing to operate the motor while access is not demanded represents a cost of electricity. Stopping and starting the hard drive motor saves some electricity, but increases the wear-and-tear on the motor. In the case of the hard drive, however, a much more important consideration is poor access time to stored data immediately after the motor is started. Adaptive disk spin-down has been disclosed in Fred Douglis, P. Krishnan, and Brian Bershad, "Adaptive disk spin-down policies for mobile computers," *Computing Systems*, 8(4):381–413, Fall 1995 (and U.S. Pat. No. 5,493,670).

In Internet communication employing dial-up modems, the situation is the same.

FIG. 1 presents a block diagram of one arrangement where modems are used to communicate with an Internet Service Provider (ISP). In this arrangement, user 100 dials a given number through its local modem 101 and, in response thereto, is connected through Public Switched Network (PSN) 10 to a distributing router 11. Router 11 is coupled to a bank of modems 20-1, 20-2, . . . 20-N, whence the modems are connected to ISP processor 30. When user 100 reaches distributing router 11 the router selects an idle modem for the connection to processor 30, for example, modem 20-2. Other users, such as user 110, can also connect to ISP processor 30 by dialing the same number. When user 110 reaches distributing router 11, that user is also connected to an idle modem, for example, modem 20-1. The connection between modems (such as modem 101 and modem 20-2) is a two-way connection, in the sense that information flows in both directions.

FIG. 2 presents a block diagram of another arrangement which, in addition to the elements included in FIG. 1, includes a cable 40 that connects ISP processor 30 to a plurality of users through a separate cable modem associated with each connected user (e.g., modems 102 and 112). In this arrangement, the conventional modems (101 and 111) are employed for sending information to modems 20-2 and 20-1, and then to processor 30, whereas the cable modems (102 and 112) are employed for sending information from processor 30 to users 100 and 110.

Typically, cable 40 is a channel that is capable of high data rates which allows the ISP to maintain a continuous, high bandwidth, connection to each of the users.

As indicated above, when a modem from bank 20 is assigned to a particular subscriber connection, but the subscriber is idle, the inactive modem represents a wasted resource. Some ISPs, therefore, employ a time-out circuit that measures the duration of the idle period of each modem in bank 20 and, at the expiration of some preselected period, such as fifteen minutes or half an hour, the connection to an inactive modem in bank 20 is dropped.

From the provider's viewpoint, a disconnected user represents a recovered resource—a modem that can be used for another user. From the user's viewpoint, if the extended idle period is the result of the user simply attending to other matters, some money can be saved if the user's access costs are sensitive to connection time. However, the "cost" in time and convenience of the user having to reconnect following such automatic idleness-caused disconnection is rather high. With today's technology, the process of reconnecting can take up as much as 40 seconds, or more, and may engender a rather high level of dissatisfaction with users who wish to not have been disconnected. Moreover, in most modem connections the ISP provides a temporary IP address for the connection. If the modem connection is terminated, there is no guarantee that upon reconnection the same IP address will be given; and if a different IP address is assigned, then existing TCP connection using the older IP address cannot reach the disconnected user and would be terminated.

SUMMARY

A balance between competing goals is struck, in accordance with the principles of this disclosure with an adaptive time-out regimen. Each user that is connected to the ISP is checked to determine whether a recent connection pattern is found for the user within the ISP's processor. A time-out threshold is then selected for the user based on this connection pattern. Specifically, the time interval between the last disconnection by the user and the time of reconnection is evaluated. When this time interval is shorter than a preselected threshold (which may be sensitive to the identity of the uses and which may be sensitive to whether the user voluntarily disconnected or not), then the time-out threshold is increased. When this time interval is longer than the preselected threshold, then the time-out threshold is decreased. Typically, when the time-out threshold is decreased, it is decreased by a significantly smaller amount that the amount by which it is increase, when it is increased.

DETAILED DESCRIPTION

Figure 1:
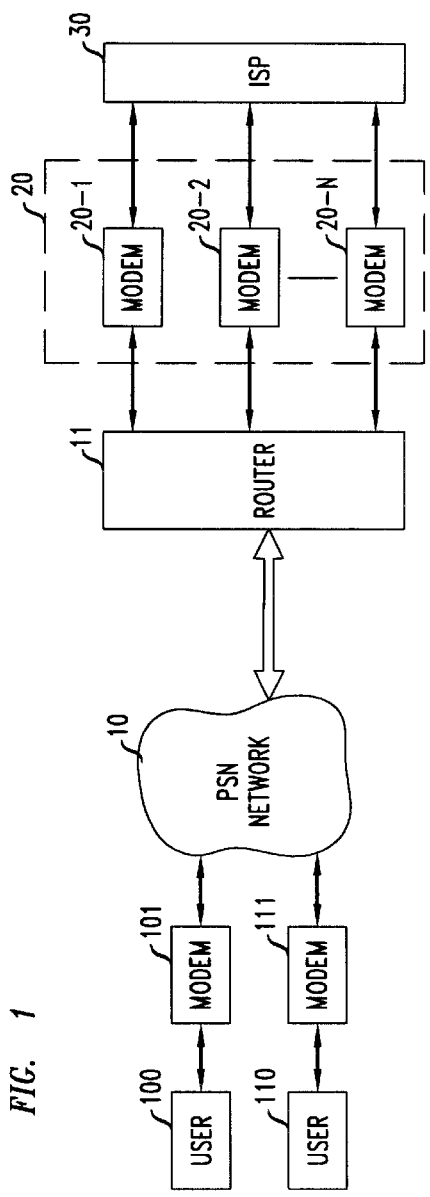
FIG. 1 presents a block diagram of a prior art arrangement of users connection to an ISP through a bank of modem via the Public Switched Network.

In accordance with the principles disclosed herein, an adaptive time-out is employed that keeps the number of undesirable disconnects by the ISP to an acceptably low level relative to total connect time. At any given time, each of the ISP modems maintains an associated timeout threshold, T. When a modem servicing a particular user has been idle for T seconds, it is disconnected. The next time that the same user is connected to the system, to that particular modem, or to any other modem in the ISP's bank of modems, a database of recently disconnected users (hereinafter, R-D database) is consulted. When a user reconnects, the duration between the time of disconnect and the time of reconnect is determined from information found in the R-D database regarding the last time that the user was disconnected. From this determination, an assessment is made as whether cost of disconnecting (e.g. in terms of user dissatisfaction) exceeds the benefit of a recovered resource (the modem and/or connect time costs). More specifically, the time interval during which the modem was unused, l, is compared to a selected minimum idle time M. If $l \geq M$, then the disconnect is deemed to have been acceptable. In such a case, in accordance with the principles of this invention, the threshold, T, is reduced. Otherwise, the disconnection is considered ill advised, and T is increased.

The above does not address the issue of whether the user voluntarily disconnected at the last disconnection, or was forcibly disconnected by the system. An embodiment that takes this fact into account can be easily achieved, of course, by including this information in the recently-disconnected database. Illustratively, a records associated with the user has a flag set when the user is dropped by the system. A number of different policies can be implemented that are sensitive to this flag, such as to always conclude that the time-out can be reduced, to always conclude that the time out should be reset to a nominal value, etc.

There are three parameters that need to be controlled: the value of M, the amount by which T is increased when it is increased, and the amount by which T is decreased when it is decreased. In accordance with one embodiment, the modifier to T is additive. In accordance with another embodiment, the modifier to T is multiplicative. In both cases, the modification is typically asymmetrical. More specifically, when T needs to be reduced, it is reduced by a small amount. On the other hand, when T needs to be increased, it is increased by a large amount. For example, in the multiplication-modification embodiment, the factors may be 1/1.1 when reducing T. and 1.4 when increasing T.

In addition to the above modifications to T, both maximum and minimum values for T may be enforced, such as one minute for a minimum and 15 minutes for a maximum. The former avoids disconnecting the modem because of a perfectly normal gap between packets, and the latter prevents the algorithm from becoming strictly worse than the most conservative fixed threshold.

Figure 3:
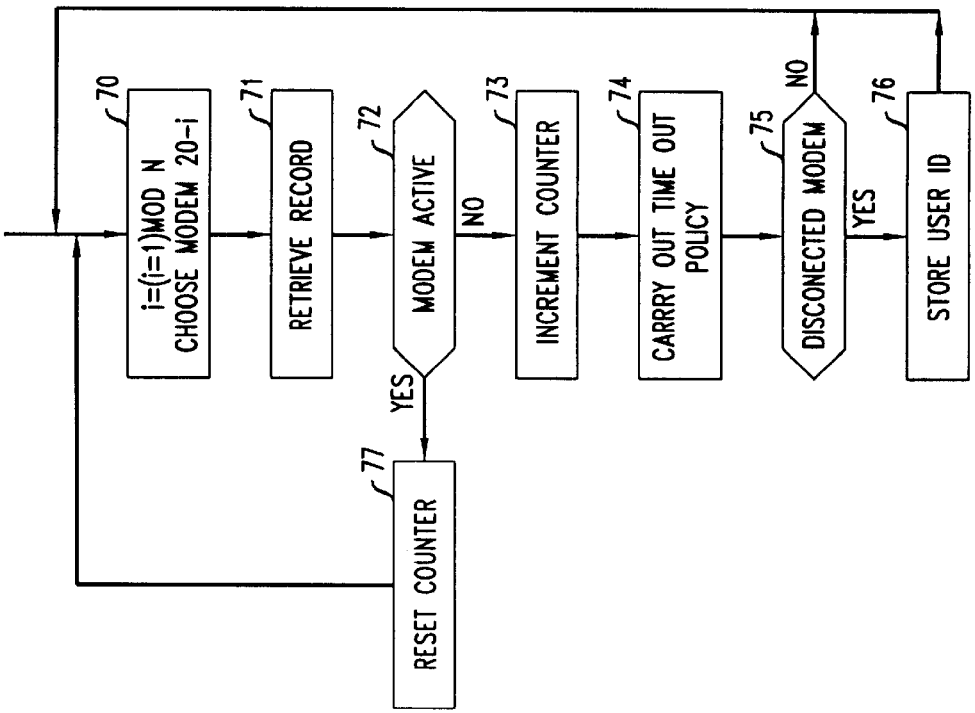
FIG. 3 presents a block diagram of a process for disconnecting modems that are idle for more than a certain time.

FIG. 3 presents a flow chart for an illustrative process of checking on the activity of modems in bank 20. Block 70 increments index i (modulo N) and then selects 20-i from bank 20 for consideration. Control then passes to block 71 where a record is retrieved from a memory within processor 30 that is associated with modem 20-i. Block 72 determines whether modem 20-i is active. If it is, control passes to block 77 which resets the idle time counter field in the retrieved record, and returns control to block 70, where the next modem is selected. If modem 20-i is found to be idle, control passes to block 73 that increments idle time counter field in the retrieved record, and passes control to block 74. Block 74 carries out the time-out policy of the ISP, which policy dictates whether the connection of modem 20-i to the user is dropped. Control then passes to block 75, which ascertains whether modem 20-i was disconnected in block 74. When the modem was not disconnected, control returns to block 70. When the connection of modem 20-i is dropped, control passes to block 76 where the following activities take place. First, the identity of the user whose modem was dropped is placed in a recently-disconnected database. Second, the record in the memory of processor 30 that references modem 20-i is accessed and modified to reflect the fact that the modem was disconnected. Control then returns to block 70.

Regardless of the policy that the ISP implements, disconnecting a modem in a situation that, ultimately, requires a customer to reconnect, represents a burden on the customer, which effectively is a user dissatisfaction cost. If this burden need not be imposed, it obviously makes sense to not impose this burden. Hence, one consideration that may be incorporated in the policy carried out in block 73 is the identity of the user who is currently using modem 20-i. Different thresholds can be applied for different users.

Also, in some situations there is no benefit for disconnecting a modem when modem bank 20 is lightly loaded. In such situations, the time-out policy may be made sensitive to the overall load that the bank of ISP modems has to deal with. This sensitivity to load can be any function that the ISP wishes to implement. For example, the sensitivity may be a step function. When the bank of modems is very lightly loaded, the time-out policy may be to not disconnect any modem. Beyond a certain load level, the policy may be to start disconnecting. Alternatively, the sensitivity may be a linear function. When the band of modems is very lightly loaded, the minimum T is large, and as the load increases the minimum value of T is reduced (though not beyond some preselected lowest level).

Further, if the customer is willing to pay a premium to avoid this burden, it obviously makes sense to provide the higher level of service and accept the higher revenue.

Still further, the time-out policy may be made sensitive to customer specification that might even override the ISP's concerns. For example, a customer may specify that when the customer is calling from a long distance that the ISP should disconnect more quickly than otherwise, even if the ISP has plenty of capacity.

Figure 4:
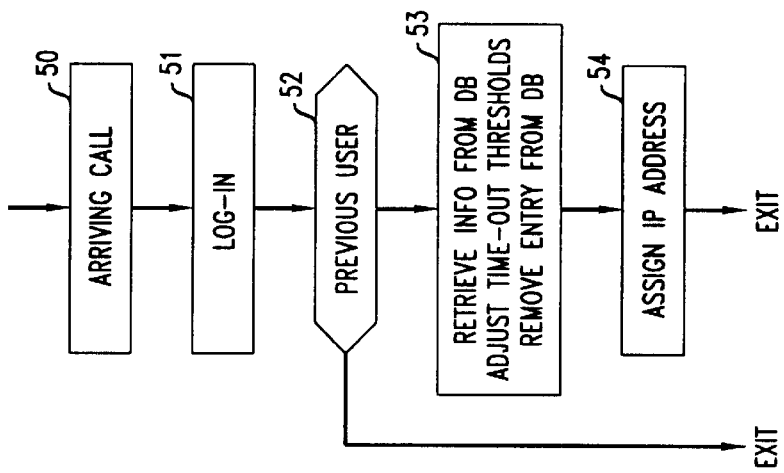
FIG. 4 presents a block diagram of a process for handling the reconnecting of users, including a modification of the disconnection thresholds.

FIG. 4 presents an illustrative flow chart of a reconnection process in accordance with the principles of this invention. A call that arrives at router 11 is assigned an idle modem in bank 20 and is sent to processor 30 via the assigned modem. This event corresponds to block 50 in FIG. 3, which triggers the FIG. 4 process and passes control to block 51. In block 51, processor 30 engages in the conventional login dialog with the user, and obtains from the user the user's identity. Control then passes to block 52 where a database of recently disconnected users is consulted. If the user's identity is not found in the database, the FIG. 3 process concludes that the newly connected user is a new user, and exits. If the user's identity is found in the database, control passes to block 53, which retrieves the appropriate record from the recently-disconnected users database, and adjusts the time-out in accordance with whatever algorithm is desired, such as the ones disclosed above, and removes the user from the recently-disconnected users database. Control then passes to block 54, which assigns an IP address.

It may be noted in passing that the R-D database does not need to be large. Any entry in the database that would clearly lead to a conclusion that the just-connected user was disconnected too long ago to be considered a reconnection following a forced disconnection, can safely be deleted. Illustratively, any entry that is older than one hour can be dropped from the R-D database.

In context of the FIG. 1 arrangement and in connection with a user who was disconnected because the modem that was assigned to the user was found to be idle for too long, a number of scenarios can exist.

1. The connection to ISP processor 30 is quiescent in the sense that there is no on-going communication between the user and other hosts on the Internet.
2. Some process exists that is expecting data from the user at some future point in time.
3. Some process exists that may wish to send data to the user at a future point.

In scenario 1, the fact that block 54 assigns an IP address that is likely to be different from the IP address that the user had prior to the user being disconnected is not a problem. No process is seeking to send information to, or receive information from, the defunct IP address. This scenario may be common if users terminate on-going communication during periods of inactivity and instead open new connections upon becoming active. By way of example, consider a user who downloads a web page, becomes idle, and then downloads a second page. Typically the new download can come from a different IP address without affecting the content provider, the page being downloaded, or other aspects of the interaction. This is because a new IP/TCP connection is established for each download, or at least after a short timeout or the failure of a preexisting connection.

Scenarios 2 and 3 may correspond to a situation with a long-running application that communicates with other hosts on the Internet. For example, consider the well-known Internet application called "telnet," which permits a user to establish a login to a remote computer. After the login and a period of inactivity, the "telnet session" still is between a pair of specific host addresses, and at any time either the user or the host to which the user is connected via telnet may send data to the other machine. Changing the IP address of the client will invalidate that connection. In the case of Scenario 2, data coming from a new IP address would be dropped by the server since no established TCP connection would correspond to it. In the case of Scenario 3, data from the server would be sent to the old IP address, which either would have no corresponding physical network address or would correspond to a completely different, newer dial-in connection.

However, in accordance with the principles disclosed herein, the process within block 75 can be adjusted to include the IP address of the user that is being disconnected in the R-D database. This IP address can be reserved for a fixed period of time to allow for reconnections using the same address. Retrieving this information in block 53 when the user reconnects, processor 30 is made aware of the old IP address, and if the old IP address is unclaimed by another client, the new IP address assigned in block 54 will be the same IP address previously used by the user. Thus, ongoing communication will continue unaffected by the disconnection and reconnection, with one possible caveat: communication from an external host on the Internet to the user, as in Scenario 3, will either not reach the user while disconnected (if connections are reestablished only if initiated by the user's machine), or they will initiate a reconnection but possibly face a time-out while that reconnection occurs (e.g., in the case of a cable modem used for the downstream link, causing a reconnection on the upstream link). In accordance with the principles disclosed herein, for scenario 3 processor 30 can serve as a buffer to receive information destined to the old IP address, and when the user reconnects, processor 30 can forward the buffered information to the user.

An alternative approach to provide transparency is to allocate a new IP address to the user while allowing communication to continue transparently despite a change in the IP address. Actually, under the assumption that the user will reconnect, the entire issue of how to continue communications with a user that was disconnected and then reconnected can be addressed by considering the "mobile IP" art. Readers can peruse, for example, a book by Charles E. Perkins titled *Mobile IP: Design Principles and Practice*, Addison-Wesley, 1998. Briefly, transparency is achieved in either of two ways:

Add a level of indirection. For instance, client communication with the Internet can be via a "proxy"; only the proxy is aware of the client's IP address, and other hosts communicate with the proxy, which has a fixed IP address.

Support mobility within the operating system. Processor 30 can translate the current IP address of the user to a previous IP address known to other hosts. Furthermore, if hosts on the Internet are aware that hosts can move, then it is possible to send a host a specific instruction to update the IP address associated with an ongoing interaction. In this case, Processor 30 can send a message to a remote host, suggesting that a new IP address should be used. If the remote host is able to modify the destination IP address to which it transmits, then processor 30 is relieved of the translation task in subsequent transmissions.

Figure 2:
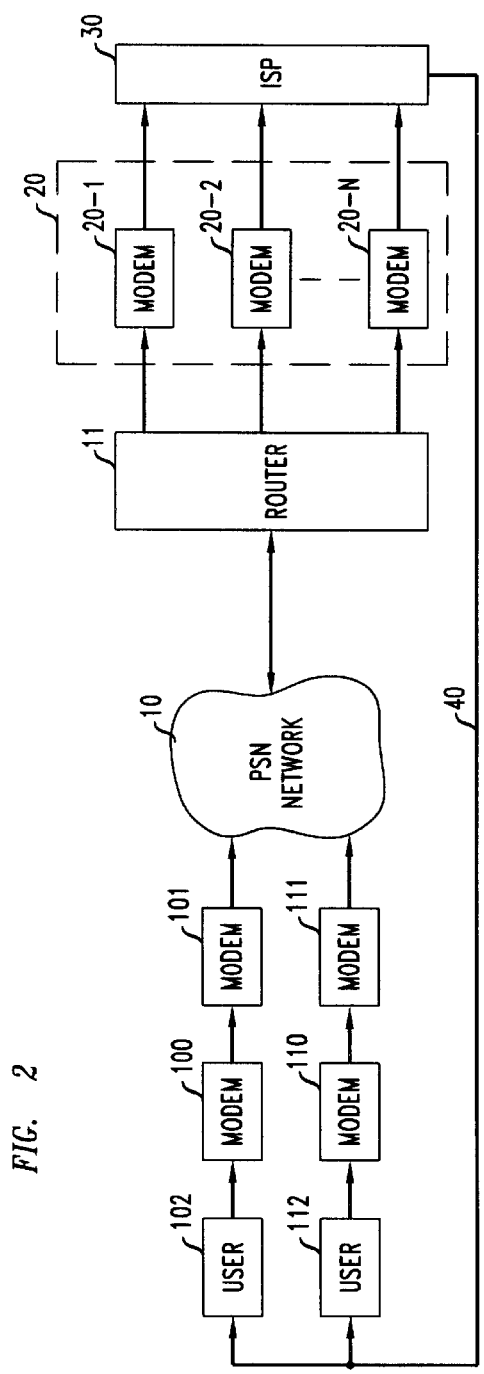
FIG. 2 presents a block diagram of a prior art arrangement where users are connection to an IPS through an uplink that employs dial-up modems and a separate downlink that employs cable modems.

In context of the FIG. 2 arrangement and in connection with a user who was disconnected because the modem that was assigned to the user in bank 20 was found to be idle for too long, the same three scenarios apply. However, the downstream connection from a remote web site to the user is not terminated because the cable connection is not terminated, and that relieves the burden. Specifically, since every user is connected to processor 30 at all times with the cable modem, there is a constant IP address that is associated with the user for down stream transmissions. This IP address is the one provided to remote web sites, and the only requirement is that processor 30 must be able to associate incoming transmissions from a modem, and the IP address that is assigned to that communication and the particular user, with the IP address that is provided to remote web sites. This, however, is a very simple correlation task that is carried out in block 53.

Note, however, that each TCP packet that is sent to the user results in the expectation of an acknowledgment in the upstream direction. Therefore, even if the cable modem delivers downstream data immediately, or processor 30 serves as a buffer prior to reconnection, it is still possible for Internet servers to time-out ongoing connections due to the lack of a response. For this reason, the "proxy" approach described above may be more suitable for adaptive modem disconnections.

In connection with the effort to utilize the modems of bank 20 as effectively as possible, it should be realized that some users make use of the ISP modem at regular intervals through the use of a timing daemon. Illustratively, automatically checking for e-mail is a capability of many browsers that run on PCs, and such checking for e-mail is not consciously selected or activated by the user. Because of the pervasiveness of such browsers, it might not be unreasonable for an ISP to decide that such use, in a sense, is not a bonafide use that should trigger the resetting action of block 72. Illustratively, assume that a user's modem is constantly active and that the time-out interval for disconnecting is 6 minutes. Assume further that every 5 minutes (starting at 00) there is a request to check for incoming mail. If the mail checking pattern is not detected, then the process of FIG. 3 would detect activity and pass control to block 72 (wherein the time-out counter is reset) before block 73 resets the counter and causes the modem to be disconnected. If, however, the mail request pattern is detected and effectively excised, then a user who stops to actively engage in communication will be disconnected. Of course, the expected regular activity will not be able to take place, but that might be acceptable to users who don't affirmatively wait for the results of this activity. Those who do care will take action to be reconnected.

Accordingly, it is useful to detect regular activity patterns and to act in accordance with whatever policy the ISP wishes to implement. This may be accomplished, for example, with a history file that is associated with each user. A review of past access and idle periods reveals a pattern, if one exists, and an algorithm can, then, act accordingly. Illustratively, we looked at a history file of past five active and idle periods.

It should be noted that in the case of an arrangement as depicted in FIG. 2, processor 30 can disconnect the modem just after the expected burst of activity and send a request through the cable to the user to reconnect itself just prior to the expected burst of activity.

The particular algorithm that may be employed to reveal the pattern may be simple, or fairly complex. An example of a simple algorithm may be to merely measure the active durations and the idle durations. A more complex algorithm may observe the direction of traffic, and the nature of the signals sent by the user. For example, a request to receive mail may be treated differently than a request to be connected to a particular remote web site.

The above-described approach is, effectively, a predictive approach. Poor predictions correspond to situations where the recent pattern is not a good predictor of the next access. To determine whether that is the case, a counter is incremented, and the predicting algorithm is suspended for a fairly extended period of time when the count of incorrect predictions exceeds a preselected threshold (e.g. two mistaken predictions). In that event, the adaptive modifications to the threshold T still apply.

We claim:

1. A method for connecting a user to a provider, comprising the steps of:
   checking whether said user had been disconnected at a prior time,
   based on said step of checking, determining whether said user was unconnected for a length of time shorter than a preselected threshold, M, and
   lengthening a time-out threshold, T, when said step of determining ascertains that the user was unconnected for a length of time shorter than said preselected threshold, M.

2. The method of claim 1 further comprising the step of shortening said time-out threshold, T, when said step of determining ascertains that said user was unconnected for a length of time, l, longer than said preselected threshold, M.

3. The method of claim 1, where said user is connected to said provider through a first modem in a bank of modems, further comprising the step of shortening said time-out threshold, T, when said step of determining ascertains that said user was connected to said provider, via some modem in said bank of modems, for a time l prior to time of performing of said step of deter and $l \geq M$.

4. The method of claim 3 where said some modem and said first modem are different modems in said bank of modems.

5. The method of claim 3 further comprising the step of lengthening said time-out threshold when said step of determining ascertains that $l<M$.

6. The method of claim 5 where said step of shortening causes a percentage reduction, A, in value of T, and said step of lengthening causes a percentage increase, B, in said value of T.

7. The method of claim 1 where said step of lengthening, executed by said provider, is dispensed with when T reaches a preselected maximum value.

8. The method of claim 2 where said step of shortening is dispensed with when T reaches a preselected minimum value.

9. The method of claim 8 where said preselected minimum value is a function of the identity of said user.

10. The method of claim 8 where said preselected minimum value is higher for users who are willing to pay more for services.

11. The method of claim 1 further comprising the step of setting said time-out threshold to a predetermined initial value when said step of determining ascertains that said user was unconnected for a length of time that is longer than L, where L is a measure of time, and is greater than M by a preselected amount.

12. The method of claim 11 where said predetermined initial value of M is a function of the ID of said user.

13. The method of claim 11 further comprising a step of accessing a service table for information to determine said predetermined initial value of T based on identity of said user.

14. The method of claim 1 further comprising assigning an IP address to said user coupled via said first modem.

15. The method of claim 14 where said IP address is independent of IP addresses previously assigned to said user.

16. The method of claim 14 where said IP address is the same as the last IP assigned to said user.

17. The method of claim 14 further comprising a step of informing a remote processor of said IP address assigned to said user.

* * * * *

UNITED STATES PATENT AND TRADEMARK OFFICE
CERTIFICATE OF CORRECTION

PATENT NO. : 6,487,596 B1
DATED : November 26, 2002
INVENTOR(S) : Fred Douglis and Tom Killian It is certified that error appears in the above-identified patent and that said Letters Patent is hereby corrected as shown below:

<u>Column 8,</u>
Line 11, "deter" should read -- determining, --

Signed and Sealed this

Twenty-seventh Day of May, 2003

JAMES E. ROGAN
*Director of the United States Patent and Trademark Office*